(12) United States Patent
Cao et al.

(10) Patent No.: US 9,626,208 B2
(45) Date of Patent: *Apr. 18, 2017

(54) MANAGING STREAM COMPONENTS BASED ON VIRTUAL MACHINE PERFORMANCE ADJUSTMENTS

(71) Applicant: International Business Machines Corporation, Armonk, NY (US)

(72) Inventors: Bin Cao, Rochester, MN (US); Jessica R. Eidem, Rochester, MN (US); Brian R. Muras, Rochester, MN (US); Jingdong Sun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 374 days.

This patent is subject to a terminal disclaimer.

(21) Appl. No.: 14/271,704

(22) Filed: May 7, 2014

(65) Prior Publication Data

US 2015/0254094 A1    Sep. 10, 2015

Related U.S. Application Data

(63) Continuation of application No. 14/198,716, filed on Mar. 6, 2014.

(51) Int. Cl.
*G06F 9/44* (2006.01)
*G06F 9/45* (2006.01)
(Continued)

(52) U.S. Cl.
CPC ........ *G06F 9/45558* (2013.01); *G06F 9/4856* (2013.01); *G06F 9/50* (2013.01);
(Continued)

(58) Field of Classification Search
CPC .... G06F 9/45558; G06F 9/45533; G06F 9/44; G06F 9/5094; G06F 2209/5022;
(Continued)

(56) References Cited

U.S. PATENT DOCUMENTS 6,516,350 B1    2/2003 Lumelsky et al.
7,020,697 B1*   3/2006 Goodman .............. G06Q 10/10
                                              709/223

(Continued)

OTHER PUBLICATIONS

Diego Ongaro et al., Scheduling I/O in Virtual Machine Monitors, ACM 978-1-59593-796-4, Mar. 2008, [Retrieved on Oct. 21, 2016]. Retrieved from the internet: <URL: https://www.cse.iitb.ac.in/~puru/courses/autumn12/cs695/downloads/schedulingio.pdf> 10 pp. 1-10.*

(Continued)

*Primary Examiner* — Thuy Dao
*Assistant Examiner* — Anibal Rivera
(74) *Attorney, Agent, or Firm* — Nolan M. Lawrence

(57) ABSTRACT

Embodiments of the disclosure include a method, a system, and a computer program product for modifying a stream operator based on the virtual resources. The method includes receiving a first resource allocation and a second resource allocation of a virtual resource for a virtual machine supporting a stream computing application. The method also includes determining whether the second resource allocation changed within a tolerance relative to the first resource allocation. The method also includes identifying a stream operator in the stream computing application using the virtual resource of the virtual machine. The method also includes modifying the stream operator to accommodate the second resource allocation in response to the second resource allocation changing relative to the first resource allocation.

5 Claims, 11 Drawing Sheets

(51) Int. Cl.
*G06F 9/455* (2006.01)
*G06F 9/50* (2006.01)
*G06F 17/30* (2006.01)
*G06F 9/48* (2006.01)
G06F 9/445 (2006.01)
H04L 29/08 (2006.01)

(52) U.S. Cl.
CPC ...... *G06F 9/5094* (2013.01); *G06F 17/30516* (2013.01); *G06F 8/61* (2013.01); *G06F 2009/4557* (2013.01); *H04L 67/289* (2013.01)

(58) Field of Classification Search
CPC .............. G06F 17/30516; G06F 11/004; G06F 9/5077; G06F 9/4856; G06F 9/5011; G06Q 10/10; H04L 63/20; H04L 67/10; H04L 67/289; H04L 67/1095
See application file for complete search history.

(56) References Cited

U.S. PATENT DOCUMENTS

| | | | |
|---|---|---|---|
| 7,613,848 B2 | 11/2009 | Amini et al. | |
| 8,359,347 B2 | 1/2013 | Branson et al. | |
| 8,377,996 B2 | 2/2013 | Kibby et al. | |
| 8,417,762 B2 | 4/2013 | Branson et al. | |
| 8,732,300 B2* | 5/2014 | Barsness | G06F 17/30516 709/223 |
| 2007/0061433 A1* | 3/2007 | Reynolds | H04L 12/2602 709/223 |
| 2007/0299980 A1 | 12/2007 | Amini et al. | |
| 2008/0005392 A1 | 1/2008 | Amini et al. | |
| 2008/0219253 A1 | 9/2008 | Pozhenko et al. | |
| 2009/0013029 A1* | 1/2009 | Childress | H04L 67/1095 709/203 |
| 2009/0106571 A1* | 4/2009 | Low | G06F 9/4856 713/310 |
| 2009/0199175 A1 | 8/2009 | Keller et al. | |
| 2009/0259345 A1* | 10/2009 | Kato | G06F 1/20 700/295 |
| 2010/0122249 A1* | 5/2010 | Anderson | G06F 9/45533 718/1 |
| 2010/0198972 A1* | 8/2010 | Umbehocker | G06F 3/0604 709/226 |
| 2011/0022812 A1* | 1/2011 | van der Linden | G06F 9/5077 711/163 |
| 2011/0131578 A1 | 6/2011 | Takagi et al. | |
| 2011/0149737 A1 | 6/2011 | Muthiah et al. | |
| 2011/0280244 A1 | 11/2011 | Gopinath et al. | |
| 2012/0137018 A1* | 5/2012 | Uhlig | G06F 11/004 709/231 |
| 2012/0179809 A1* | 7/2012 | Barsness | G06F 17/30516 709/224 |
| 2012/0233315 A1 | 9/2012 | Hoffman et al. | |
| 2012/0246740 A1 | 9/2012 | Brooker et al. | |
| 2013/0031335 A1 | 1/2013 | Santosuosso et al. | |
| 2013/0031556 A1 | 1/2013 | Branson et al. | |
| 2013/0080621 A1* | 3/2013 | Jain | G06F 9/5094 709/224 |
| 2013/0080641 A1* | 3/2013 | Lui | H04L 67/10 709/226 |
| 2013/0111034 A1 | 5/2013 | Upadhya | |
| 2013/0132971 A1 | 5/2013 | Assuncao et al. | |
| 2013/0138816 A1* | 5/2013 | Kuo | G06F 9/5011 709/226 |
| 2013/0198489 A1* | 8/2013 | Branson | G06F 9/44 712/200 |
| 2013/0254384 A1 | 9/2013 | Wray | |
| 2013/0290489 A1 | 10/2013 | Branson et al. | |
| 2014/0172944 A1* | 6/2014 | Newton | H04L 67/289 709/202 |
| 2014/0331277 A1* | 11/2014 | Frascadore | H04L 63/20 726/1 |

OTHER PUBLICATIONS

Don Carney et al., Operator Scheduling in a Data Stream Manager, 2003, [Retrieved on Oct. 21, 2016]. Retrieved from the internet: <URL: http://dl.acm.org/citation.cfm?id=1315523> 12 pp. 1-12.*
Chen et al., "Adaptive Audio-aware Scheduling in Xen Virtual Environment", 2010 IEEE/ACS International Conference on Computer Systems and Applications (AICCSA), pp. 1-8. DOI: 10.1109/AICCSA.2010.5586974.
Mell et al., "The NIST Definition of Cloud Computing", National Institute of Standards and Technology, NIST Special Publication 800-145, Sep. 2011, Gaithersburg, MD.
Simmhan et al., "Floe: A Continuous Dataflow Framework for Dynamic Cloud Applications", University of Southern California, 2013. http://ceng.usc.edu/~simmhan/pubs/simmhan-usctr-2013.pdf.
Yuan et al., "A Middleware Framework Coordinating Processor/Power Resource Management for Multimedia Applications", GLOBECOM '01: Global Telecommunications Conference, 2001, IEEE, vol. 3. DOI: 10.1109/GLOCOM.2001.965920.
Cao et al., "Managing Stream Components Based on Virtual Machine Performance Adjustments", U.S. Appl. No. 14/198,716, filed Mar. 6, 2014.
Waldemar Hummer et al., "Elastic Stream Processing in the Cloud", 2012, [Retrieved on Jul. 7, 2015]. Retrieved from the internet: <URL: http://www.infosys.tuwien.ac.at/staff/hummer/docs/2013-wire-esp.pdf> 14 pp. 1-14.
Junwei Cao et al., "Dynamic Control of Data Streaming and Processing in a Virtualized Environment", 2011, [Retrieved on Jan. 14, 2016]. Retrieved from the internet: <URL: http://www.mit.edu/~caoj/pub/doc/jcao_j_tase.pdf> 12 pp. 1-12.
Vasconcelos et al., "Autonomous Load Balancing of Data Stream Processing and Mobile Communications in Scalable Data Distribution Systems", International Journal on Advances in Intelligent Systems, vol. 6 No. 3 & 4, 2013, pp. 300-317, http://www.iariajournals.org/intelligent_systems/.
Tatbul et al., "Load Management and High Availability in the Borealis Distributed Stream Processing Engine", 2006, Retrieved on Aug. 14, 2016, 20 pages.
Cervino et al., "Adaptive Provisioning of Stream Processing Systems in the Cloud", 2012 IEEE 28th International Conference on Data Engineering Workshops, pp. 295-301.

* cited by examiner

MANAGING STREAM COMPONENTS BASED ON VIRTUAL MACHINE PERFORMANCE ADJUSTMENTS

BACKGROUND

The present disclosure relates to stream computing, and in particular, to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the present disclosure include a method, a system, and a computer program product for modifying an operator graph configuration based on the underlying virtual resources.

One embodiment is directed toward a method. The method includes receiving a first resource allocation and a second resource allocation of a virtual resource for a virtual machine supporting a stream computing application. The method also includes determining whether the second resource allocation changed within a tolerance relative to the first resource allocation. The method also includes identifying a stream operator in the stream computing application using the virtual resource of the virtual machine. The method also includes modifying the stream operator to accommodate the second resource allocation in response to the second resource allocation changing relative to the first resource allocation.

Another embodiment is directed toward a system. The system includes one or more servers providing a virtual resource to a virtual machine. The system also includes the virtual machine hosting a plurality of stream operators from a stream computing application. The system also includes a virtualization manager that manages an allocation of the virtual resource from the one or more servers to the virtual machine. The virtualization manager is configured to receive a first resource allocation and a second resource allocation of the virtual resource supporting a stream computing application. The virtualization manager is also configured to determine whether the second resource allocation changed within a tolerance relative to the first resource allocation. The system also includes a stream manager that manages functions from the plurality of stream operators. The stream manager is configured to identify the plurality of stream operators in the stream computing application supported by the virtual resource. The stream manager is also configured to prioritize the plurality of stream operators to modify based on a utilization metric of the virtual resource. The stream manager is also configured to modify a prioritized stream operator from the plurality of stream operators to accommodate the second resource allocation in response to the second resource allocation changing relative to the first resource allocation.

Yet another embodiment is directed toward a computer program product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
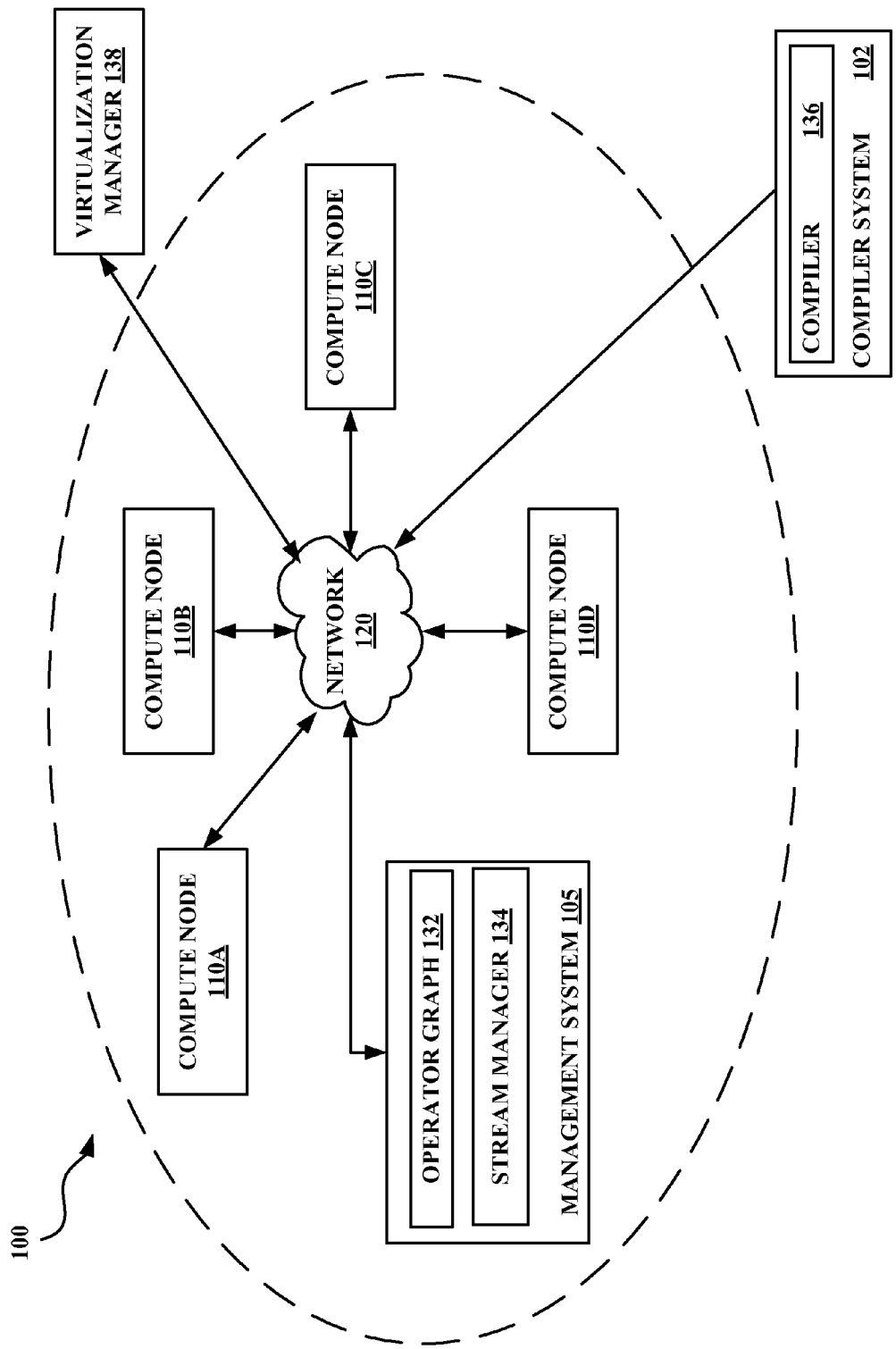
FIG. 1 illustrates a computing infrastructure configured to execute a stream computing application according to various embodiments.

The present disclosure relates to stream computing, and in particular, to computing applications that receive streaming data and process the data as it is received. For instance, a virtual machine on a distributed cloud network can host a compute node or a portion of a stream computing application, e.g., an operator graph, or a portion thereof. The virtual machine receives virtual resources from the distributed cloud network such as Central Processing Unit (CPU) resource access, network resource, or memory resource access. When the virtual resources for a virtual machine changes, then the operator graph or, more specifically, stream operators that are hosted by the virtual machine change in function. For example, when a CPU virtual resource increases for a virtual machine, then the stream operator on the virtual machine is modified to increase processing resources. Aspects of the present disclosure can relate to modifying a portion of the stream computing application in response to changes in the virtual resources of the virtual machine. While the present disclosure is not necessarily limited to such applications, various aspects of the disclosure may be appreciated through a discussion of various examples using this context.

A virtual resource refers to resources that are distributed to virtual machines. Virtual resources can include computational resources such as CPU access, memory, network bandwidth, storage but can also include export regulations and encryption. For example, if an export regulation is used, then the geographic location of a server can be a virtual resource. The number of virtual machines that be hosted by servers based in a particular country may be restricted.

Although not necessarily limited thereto, embodiments of the present disclosure can be appreciated in the context of streaming data and problems relating to mapping the template elements to virtual machines in a cloud computing environment. Throughout this disclosure, the term template elements can generically refer to a processing element or a stream operator used in a template. Abbreviations used can include "S.O." or "OP" for stream operator, PE for processing element, and VM for virtual machine.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average.

FIG. 1 illustrates one exemplary computing infrastructure 100 that may be configured to execute a stream computing application, according to some embodiments. The computing infrastructure 100 includes a management system 105 and two or more compute nodes 110A-110D—e.g., hosts or a resource/partition in a cloud computing environment—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120. The compute nodes 110A-110D can be a hardware resource that supports the operation of the processing of the stream of tuples. The compute nodes 110A-110D can also be the hardware resources for a cloud computing environment. As discussed herein, the compute nodes 110A-110D can also be the virtualization platform for virtual machines.

Figure 3:
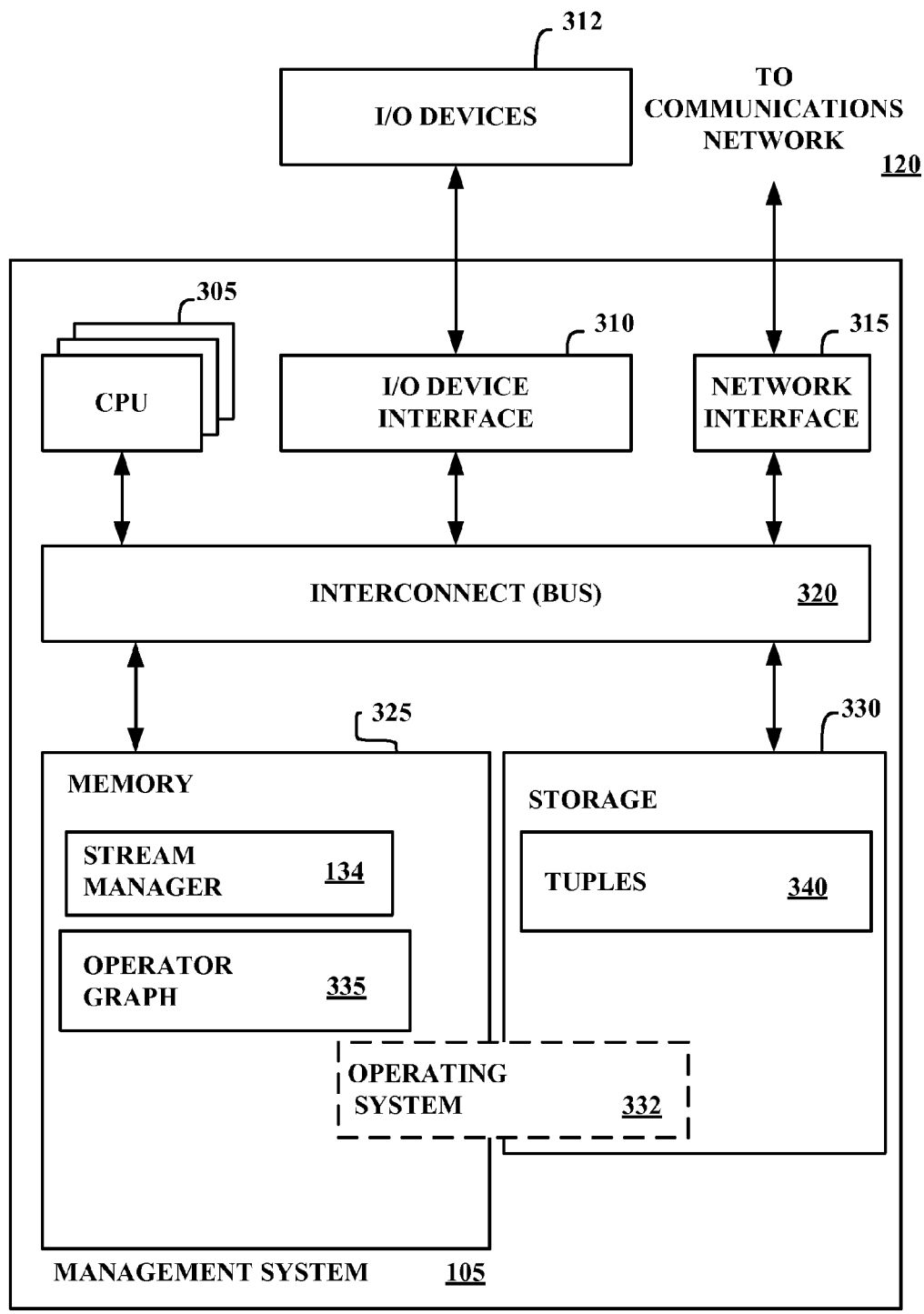
FIG. 3 illustrates a more detailed view of the management system of FIG. 1 according to various embodiments.

The management system 105 can control the management of the compute nodes 110A-110D (discussed further on FIG. 3). In various embodiments, the management system 105 is a compute node configured to be running stream management software. The management system 105 can have an operator graph 132 with one or more stream operators and a stream manager 134 to control the management of the stream of tuples in the operator graph 132. The stream manager 134 can manage the processes from the operator graph, including anything associated with the operator graph 132. In various embodiments, the stream manager 134 can be responsible for the insertion of a template into the operator graph and creating the processing elements and stream operators that insert into the operator graph 132 at an insertion point. The insertion point can be the point in the operator graph 132 where the template is deployed. The template can be deployed before an operator graph, in the middle of an operator graph, or at the end of an operator graph.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

The computing infrastructure 100 can also have a virtualization manager 138. The virtualization manager 138 can be responsible for the assignment of processing elements to specific virtual machines on the compute nodes 110A-110D. The virtualization manager 138 can be distinct from the stream manager 134 in that the virtualization manager 138 can manage the compute nodes and the assignment of a processing element to a virtualized hardware element. An aspect of this disclosure is to avoid the compiling of an operator graph whenever the underlying virtual machine changes.

Figure 2:
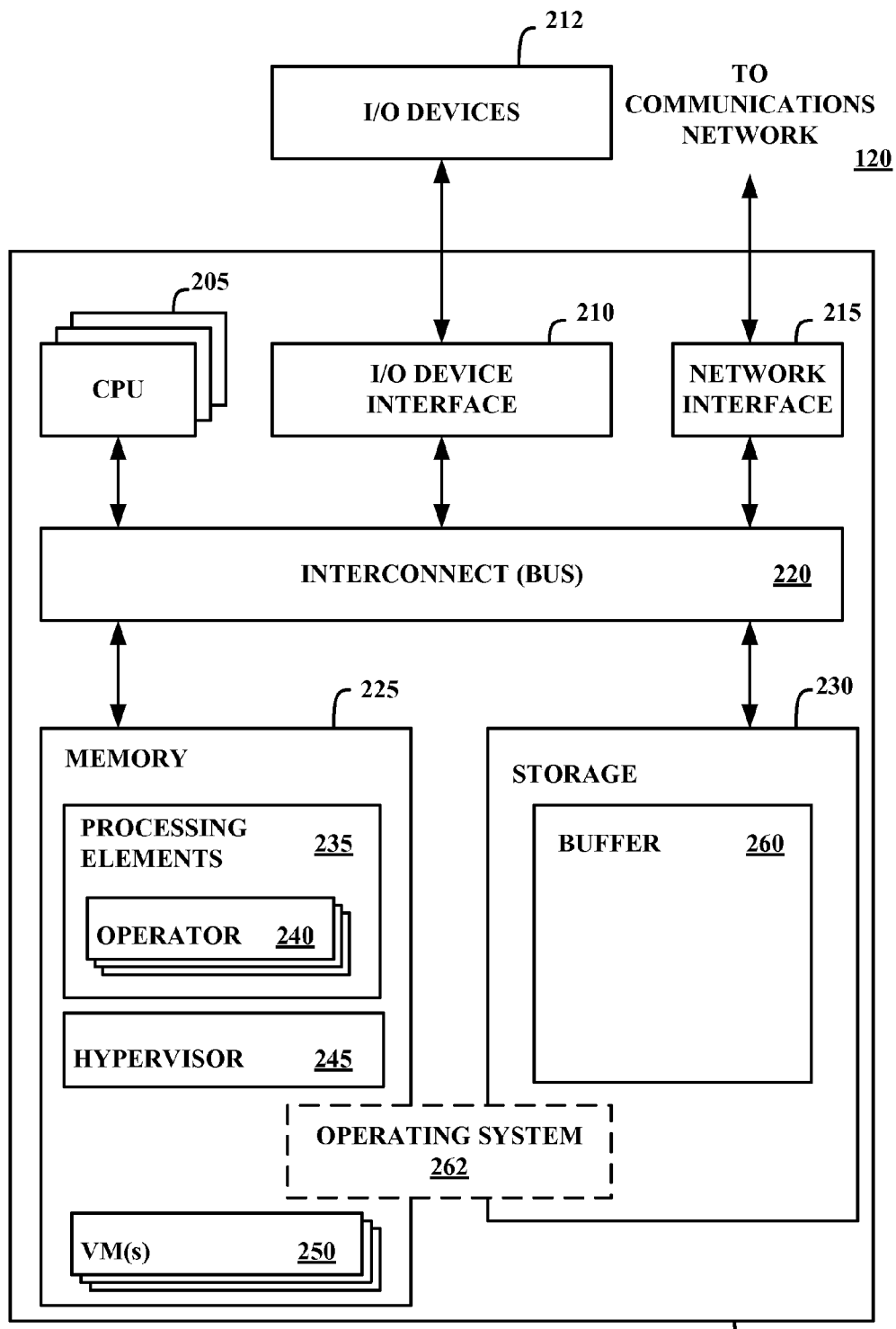
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A compute node 110 can be configured to have a hypervisor 245. The hypervisor 245 can be configured to distribute the hardware elements, e.g., the CPUs 205, the memory 225, the storage 230, to the virtual machines 250. The hypervisor 245 can run as a separate program or be imbedded into the firmware of the compute node 110. The virtual machine 250 can replicate the experience of a standalone compute node to a variety of users without degrading performance. Due to spikes in demand, the hypervisor 245 can be configured to dynamically distribute the hardware resources to the virtual machine where the hardware resources of the compute node are most demanded.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. The stream manager 134 can have software features that manage the stream of tuples through operator graph 335. The stream manager 134 can also perform aspects of the disclosure. For example, the stream manager 134 can modify the operator graph 335 to increase or decrease threads between stream operators.

According to various embodiments, an operator graph 335 can run in memory 325 and the corresponding data tuples 340 can be processed and stored in databases associated with the storage element 330. The stream manager 134 can also require a database when reading or writing from storage 330 and logging from storage 330.

Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
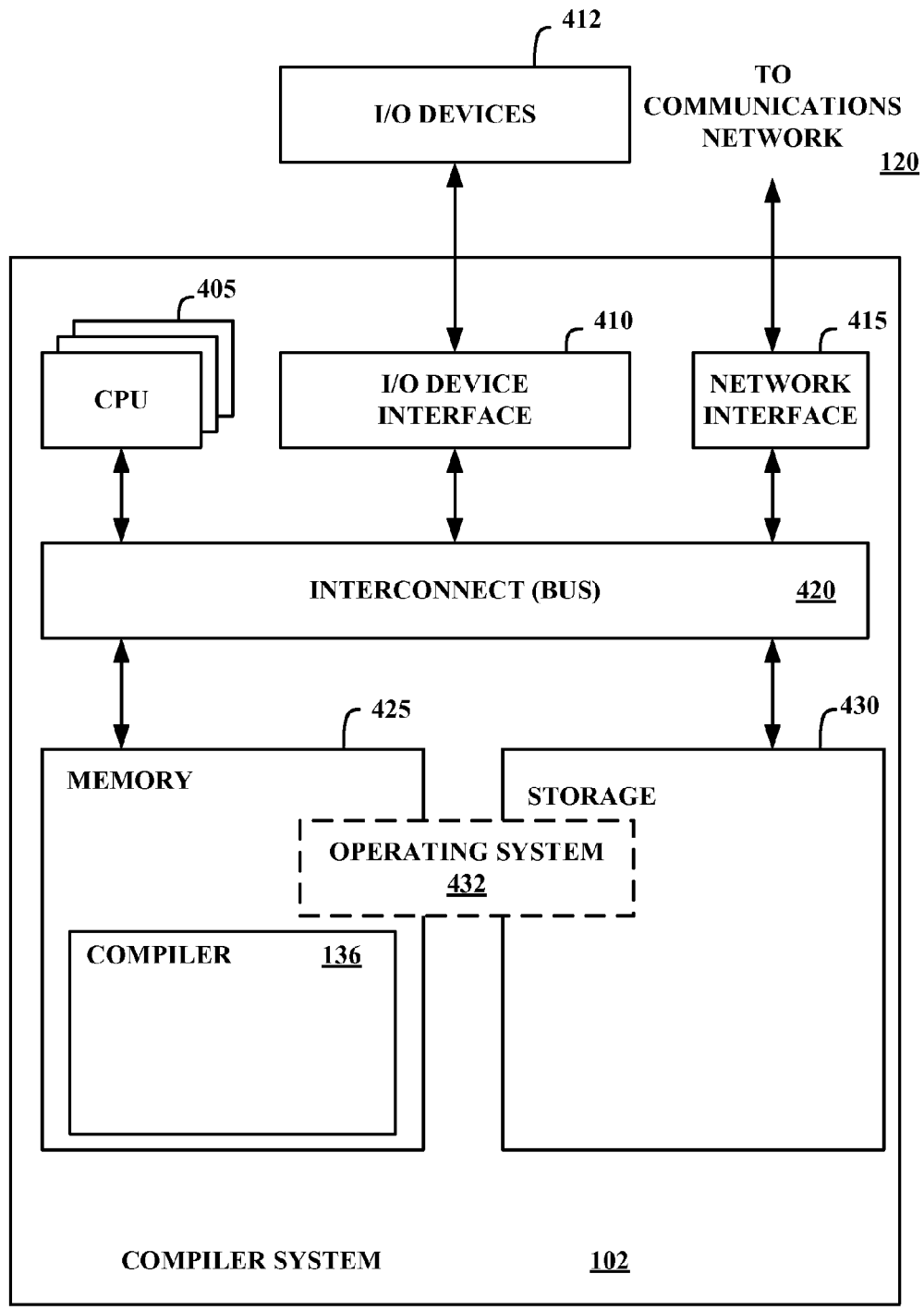
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

In various embodiments, the compiler 136 can include the windowing operation on a particular stream operator on the operator graph 335 during compile time by writing the windowing operation onto a particular stream operator. In various embodiments, the windowing operation may be included as a default and activated from the stream manager 134. The windowing operation may also be included as an optional feature for a particular stream operator and may be activated by the application.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
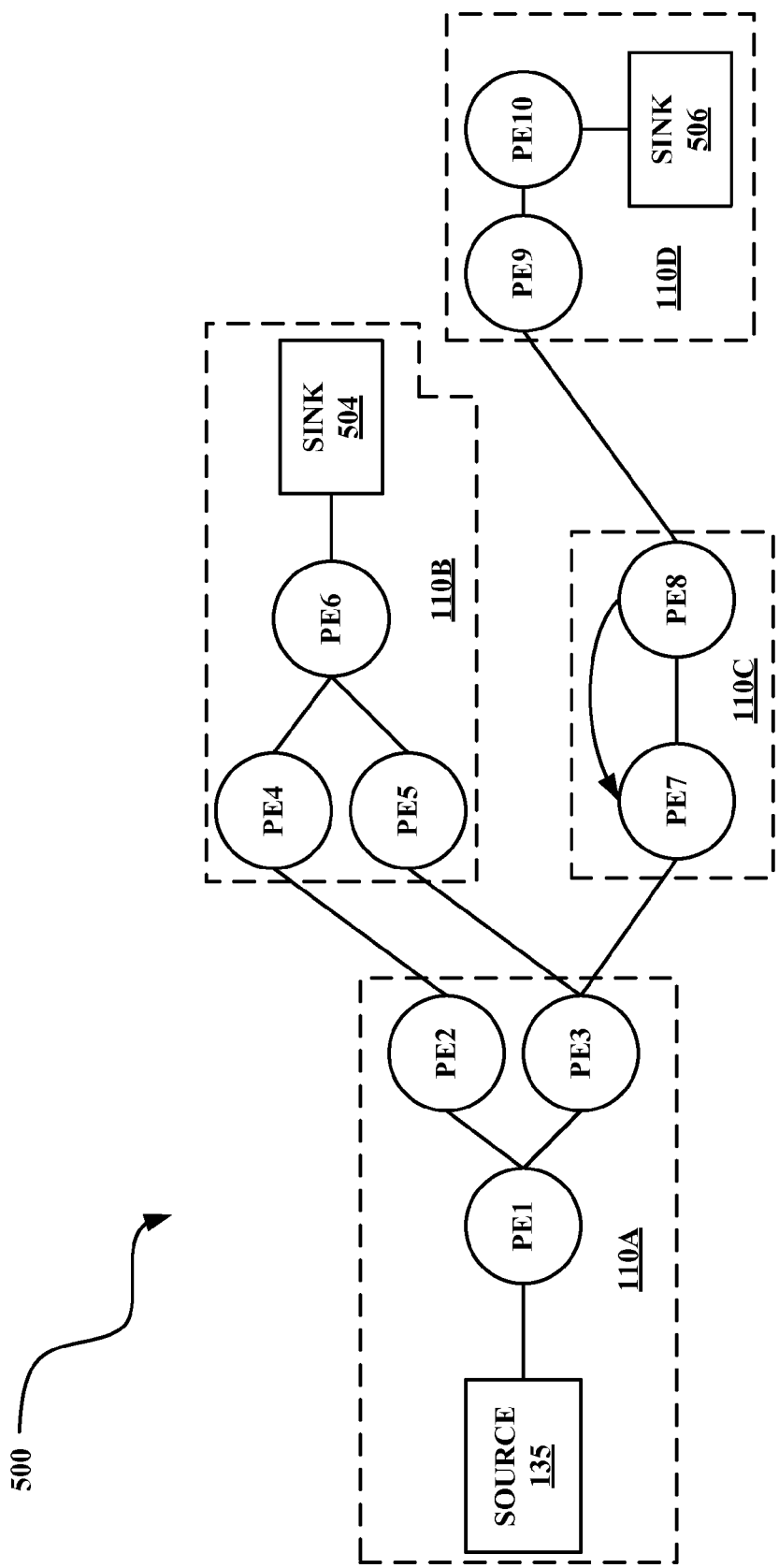
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. The operator graph 500 may be comparable to the operator graph 132 in FIG. 1. In various embodiments, the operator graph 132 in FIG. 1 represents the management of the operator graph 500. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 and sink 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example, PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

In various embodiments, a virtual resource is allocated to the virtual machine. In the stream computing application, a virtual machine supports a compute node, e.g., 110A-D, which in turn supports the processing of one or more processing elements. The processing elements, e.g., PE1-PE10, further support an operator graph of stream operators configured to perform a certain function. A stream operator resource allocation is the amount of virtual resources allocated to a stream operator. For example, a stream operator may have a memory allocation of 5 megabytes (MB) and be supported by a virtual machine with 3 gigabytes (GB) of memory with the virtual machine supporting several other stream operators. Although reference is made in the context of stream operators, aspects of the disclosure apply to processing elements or any portion of the stream computing application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
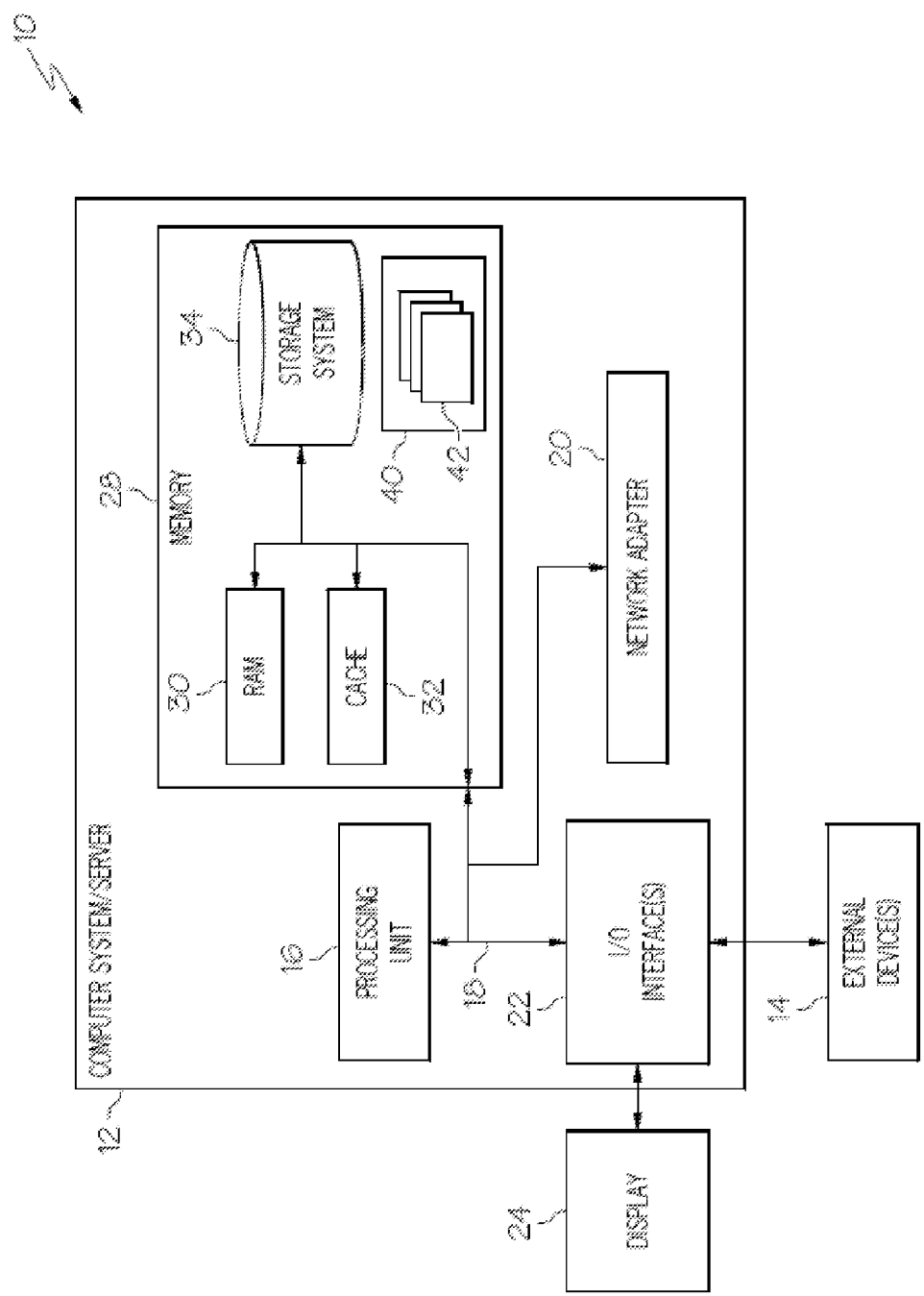
FIG. 6 illustrates a cloud computing node, according to various embodiments.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
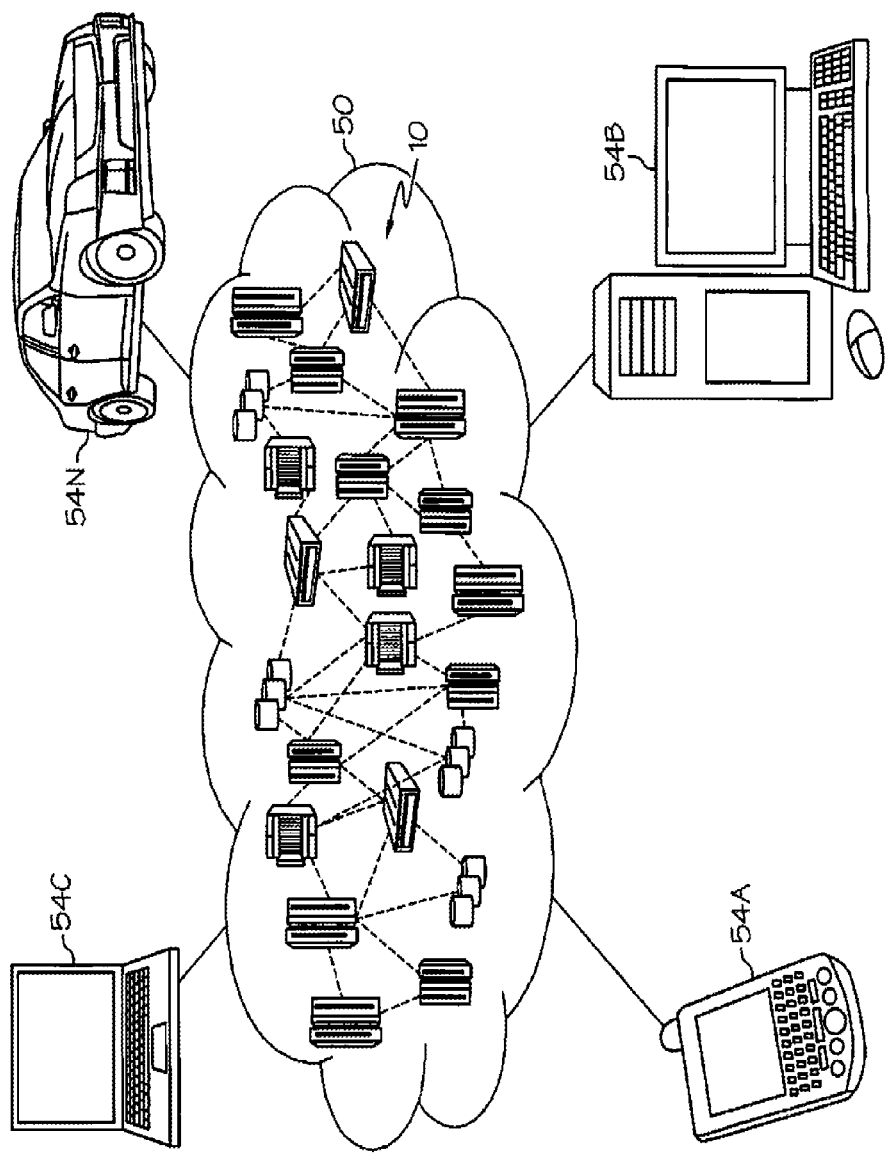
FIG. 7 illustrates a cloud computing environment, according to various embodiments.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 8:
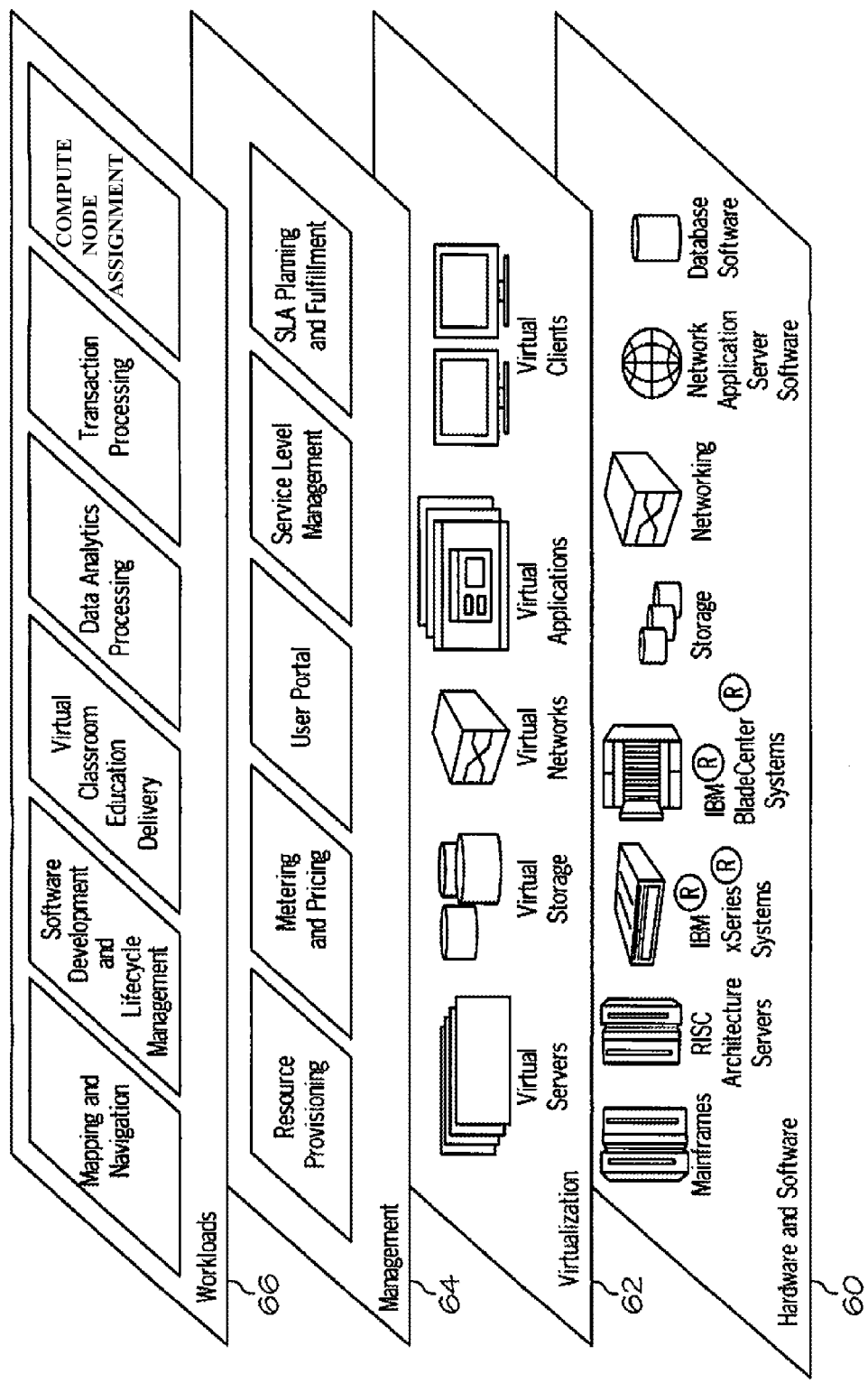
FIG. 8 illustrates abstraction model layers, according to various embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and compute node assignment to virtual machines.

Figure 9:
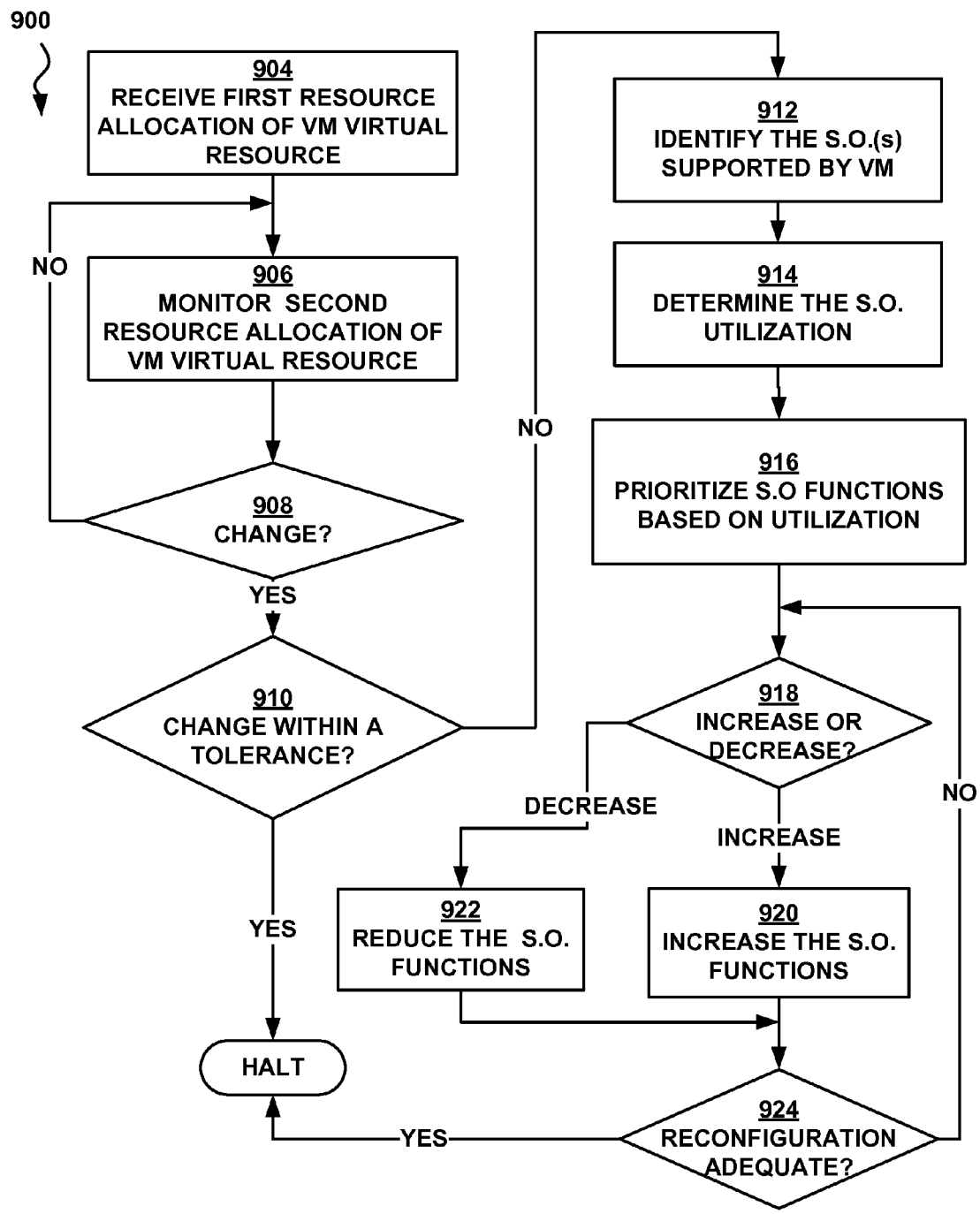
FIG. 9 illustrates a flowchart of a method for modifying an operator graph in response to changes in virtual resources of a virtual machine, according to various embodiments.

FIG. 9 illustrates a flowchart of a method 900 for modifying the operator graph in response to changes in virtual resources of a virtual machine, according to various embodiments. The method 900 may also modify the functions of a portion of the operator graph, e.g., a stream operator. The virtualization manager monitors the virtual resources of a virtual machine for changes. Once a change is detected, the virtualization manager communicates with the stream manager to modify the stream operator supported by the virtual resource to accommodate the new resource allocation. The method 900 begins at operation 904.

In operation 904, the virtualization manager receives a first resource allocation of a virtual machine virtual resource from a system administrator or a cloud controller. The first resource allocation may be determined using a system policy and implemented through the virtualization manager. The resource allocation may also be determined by an administrator or initialized within the processing element. The virtualization manager may require administrative permissions to be able to examine the virtual resources for a virtual machine, according to various embodiments.

The virtualization manager measures the resource allocation of various virtual resources (of a virtual machine) using assorted metrics. For example, the virtual resource such as a memory, CPU, network card, or storage device can be measured in absolute terms, e.g., 50 GB of usage for a memory, 3 million CPU cycles/second for a processor, 500 GB of data transferred for a network card. The virtual resource can also be measured in relative terms, e.g., a percent utilization of the memory, a minimum usage of the CPU, etc. According to various embodiments, the resource allocation refers to allocated virtual resources for the virtual machine.

In various embodiments, virtual machine receives a first, or initial, resource allocation of a virtual resource. The first resource allocation can be the baseline for comparison with a later determined second resource allocation. The virtualization manager saves the first resource allocation in a cache or paging file for later use. Once the virtualization manager receives an initial resource allocation for a virtual resource, then the method 900 continues to operation 906.

In operation 906, the virtualization manager monitors a second resource allocation for the virtual resource of the virtual machine. The second resource allocation can be a recent resource allocation reading and is the same or different than the first resource allocation. For example, the first resource allocation can be 3 million CPU cycles/second, and the virtualization manager monitors the second resource allocation at 4 million CPU cycles/second. The second resource can also be 2 million CPU cycles/second. Each virtual resource can be monitored independently. For example, the CPU virtual resource may be compared with other instances of the CPU virtual resource. Once the second resource allocation is determined, then the method 900 continues to operation 908.

In operation 908, the virtualization manager determines whether the second resource allocation changed, i.e., the difference between the first resource allocation and the second resource allocation is non-zero. For example, there may be a change when the first resource allocation is 3 million CPU cycles, and the second resource allocation is 4 million CPU cycles. In previous systems, the virtual resource of 1 million CPU cycles would not be used by the virtual machine with out manual recompilation of the operator graph. An aspect of the current disclosure is that a streams manager is configured to adjust an operator graph to utilize more or fewer virtual resources than initially allocated without manual recompilation of the operator graph. If there is a change detected, then the method 900 continues to operation 910. If there is not a change detected, then the method 900 continues to operation 906 where the virtualization manager continues to monitor the second resource allocation for a change.

In operation 910, the virtualization manager also determines whether the change in resource allocation is within a tolerance. The tolerance is defined as a permissible range for the difference between the first resource allocation and the second resource allocation, i.e., the change. If the change is within a tolerance, then the change in resource allocation is not significant. For example, for a change of 1 million CPU cycles/second in a system with 1 billion CPU cycles/second and a tolerance of 3 million CPU cycles/second, the change would be within the tolerance and not be significant. Once the virtualization manager determines whether the change is within a tolerance, then the method 900 halts. In various embodiments, the method 900 continues to operation 906, if the change is within a tolerance, where the second resource allocation is monitored.

The significance of the difference influences the tolerance. In various embodiments, the significance of the change is determined by a system policy. The significance of the change can refer to the tolerance. The tolerance can also be configurable and different for different processing elements and stream operators depending on the operation. The system policy can specify that a change greater than +/−10% is within a tolerance. The system policy can also specify a dynamic tolerance based on factors like system load or operator load, e.g., buffer size. For example, if the buffer size is running at 90+% and the change is an increase of 5% of the resource allocation, then the virtualization manager can determine that the change is significant. In another example, if the buffer size is running at 5% and the change is an increase of 25% of the resource allocation, then the virtualization manager can determine that the change may not be significant.

In another example, the virtualization manager can use a formula to determine significance/tolerance. The formula can resemble the following: ResourceUtilization+ 2*ChangeInResourceAllocation>Tolerance, where ResourceUtilization and ChangeInResourceAllocation is determined by an arbitrary scoring system. In various embodiments, ResourceUtilization and ChangeInResourceAllocation are defined as percentages, then reconfigured the stream operator when Tolerance is over 75%. In various embodiments, Tolerance fluctuates based on history. For example, at slow times, Tollerance is 100 (in a scoring system), whereas during busy times, Tollerance could be 50.

In various embodiments, the tolerance can be determined by a threshold value. For example, if the virtual resource is memory, then the threshold can be 50% of the original memory amount. Thus, if the first resource allocation is 20 gigabytes (GB) and the second resource allocation is 60 GB, then the difference would be past the threshold and therefore not within the tolerance. The allocation of the virtual resource can change for any reason that can be external to the streaming application. For example, if a virtual resource is assigned to a virtual machine supporting the streaming application and assigned to another virtual machine, then a change in the external virtual machine, e.g., a resource increase, can decrease the amount available to the virtual machine supporting the streaming application. If the change is not within a tolerance, then the method 900 continues to operation 912.

In operation 912, the virtualization manager communicates with the stream manager. The stream manager identifies one or more stream operators that are supported by the virtual machine with the changed virtual resources. In various embodiments, the virtualization manger first determines the virtual machine with the change in virtual resources. The virtualization manager communicates the changed virtual machine with the stream manager to determine the identity of the operator graph elements, e.g., stream operators.

In various embodiments, the virtualization manager can communicate the change to the stream operators via the stream manager. The stream operator adjusts to the additional virtual resources determined by the stream manager, according to various embodiments. Assuming that the stream manager assigns too many virtual resources to the stream operator, then the virtual machine can reduce virtual resources for the stream operator relative to other stream operators. The virtual machine can also reduce virtual resources for a set of cloud applications in addition to other stream operators that might be hosted on the same virtual machine. Once the stream operator is identified, then the method 900 continues to operation 914.

In operation 914, the stream manager can determine the utilization for each stream operator supported by the virtual machine. Every stream operator using virtual resources may have a utilization level for the virtual resource. For example, in a virtual machine with two stream operators assigned, the stream manager can communicate to the virtualization manager that the first stream operator uses 1 GB of the memory out of 10 GB and the second stream operator uses 1.5 GB of the memory out of 10 GB. In various embodiments, a snapshot of the usage of a processing element may be stored for reference. If the virtual resource is changed from 10 GB to 15 GB, then the utilization level may change for the first stream operator and second stream operator. In various embodiments, a stream operator may not be assigned a proportional amount of virtual resources relative to other stream operators on the virtual machine. The stream operator may also be assigned as proportional amount of virtual resources depending on the system policy.

The utilization is measured using a utilization metric. The utilization metric is a metric that measures a utilization of a virtual resource by a stream operator. The utilization metric can be a percent utilization or a measured value such as memory usage. The utilization metric can be measured relative to the second resource allocation in various embodiments. Once the utilization for the stream operators is determined, the method 900 continues to operation 916.

In operation 916, the stream manager prioritizes stream operator functions based on the utilization of virtual resources. The stream operator functions can be closely tied to the virtual resources. In various embodiments, modifying the stream operator functions affects the virtual resource. For example, a memory buffer corresponds to the memory virtual resource and a number of processing threads corresponds to the processor virtual resource. The stream manager will avoid stealing resources from one stream operator with a high utilization to give to another stream operator with low utilization.

In various embodiments, the stream manager adjusts on a relative basis on what the stream operators need and what the other applications on the virtual machine require. For example, if the stream operator is an aggregate stream operator using a 4 GB buffer of memory at full processing capacity, and the current memory assigned to the aggregate stream operator is 5 GB, then any additional memory would not benefit the aggregate stream operator. Thus, in the example, the aggregate stream operator would be lower on the priority for the memory virtual resource. In another example, if the aggregate stream operator has information spikes that require a 4 GB buffer of memory and the current memory allocated to the aggregate stream operator is 3 GB, then the aggregate stream operator would benefit from the increased virtual resource and be assigned a higher priority.

In various embodiments, more than one virtual resource may be prioritized by the stream operator. For example, in a virtual machine that has had an increase in the CPU resource allocation and a decrease in the memory resource allocation, the stream operator may be prioritized high for processing threads but low for memory capacity. In this example, the stream operator is using 3 CPU threads out of 3 available threads on the virtual machine and using 4 GB out of 10 GB of memory available in the virtual machine. Therefore, in the event of an increase in both the CPU virtual resource and the memory virtual resource for the virtual machine, the CPU threads for the stream operator may increase but not the memory. Once the stream operator functions are prioritized, then the method 900 can continue to operation 918.

In operation 918, the stream manager receives an indication from the virtualization manager that the virtual machine resource allocation has either increased or decreased. The indication can be generated in operation 910 when the difference is determined and the difference is determined to be within a tolerance. In various embodiments, the increase or decrease is determined with reference to a single virtual resource. For example, if the CPU virtual resource increased and the memory virtual resource decreased for the virtual machine, then the increase in the CPU virtual resource can be evaluated first. If there is an increase in the resource allocation, then the method 900 continues to operation 920. If there is a decrease in the resource allocation, then the method 900 continues to operation 922.

In operation 920, the stream manager can increase the stream operator function. An increase in the function can correspond to the virtual resource that concerns the function. For example, if a memory virtual resource is increased for the stream operator, then the stream manager can increase the memory buffer for the stream operator. In the mentioned example, an increase in the memory virtual resource allocated would not necessarily result in an increase in CPU threads to enhance processing. However, an increase in the CPU threads could be possible if the increase in the CPU threads also allowed the stream operator to take advantage of the additional memory virtual resource. In various embodiments, the stream operator can have virtual resource dependencies. For example, assuming that a certain operation from a stream operator requires a ratio of memory and CPU, and the stream manager increased to the number of CPU threads for the stream operator, then the memory resource for the stream operator can also be adjusted. Once the function of the stream operator is increased, then the method 900 can continue to operation 924.

In operation 922, the stream manager decreases the stream operator function. For example, if the memory virtual resource allocation decreased for the stream operator, then the stream manager can decrease the memory buffer. In various embodiments, the decrease can occur at lower increments than the increase. For example, for an increase in the stream operator function for an increased memory virtual resource of 10 MB, the stream operator can increase the buffer by 5 megabytes (MB). For a decrease in the stream operator function of a 10 MB decrease in the memory virtual resource, the stream operator can reduce the buffer by 2 MB. Once the function of the stream operator is decreased, then the method 900 continues to operation 924.

In operation 924, the virtualization manager can monitor the virtual machine to determine whether the reconfiguration of the stream operator is adequate. The stream operator reconfiguration can be adequate if the utilization metric, e.g., a percent utilization, of the increased virtual resource on the virtual machine is within a certain virtual resource range, e.g., greater than 90% utilization. The virtual resource range can be a range that the stream operator runs optimally. For example, if the stream manager reconfigures the stream operator to take advantage of the increased memory virtual resource, then the reconfiguration/modification can increase the buffer function of the stream operator. The stream operator can be measured for the utilization metric for the memory virtual resource and the stream operator percent utilization can be 91%. A higher utilization metric for the stream operator can indicate an adequate configuration.

The stream manager can determine whether the reconfiguration is adequate by also monitoring tuple processing performance metrics. The tuple processing performance metric is based on how tuples flow through an operator graph. For example, if the CPU threads are increased for a first stream operator that outputs to a second stream operator, and the second stream operator becomes a bottleneck, then the stream manager can reconfigure the operator graph using stream management techniques. In various embodiments, the virtualization manager is required to have administrative access to view the percent utilization on the virtual machine.

The stream manager can measure the utilization of the memory virtual resource by the stream operator. In the aforementioned example, if the utilization is above 90%, then the stream manager communicates to the virtualization manager the utilization level, determines that the reconfiguration is adequate, and the method 900 halts. In various embodiments, the method 900 may begin again with a new first resource allocation of a virtual resource. If the utilization is below 90% utilization, then the utilization is inadequate and the method 900 continues to operation 918 where the stream operation functions can be increased or decreased depending on the percent utilization.

Figure 10:
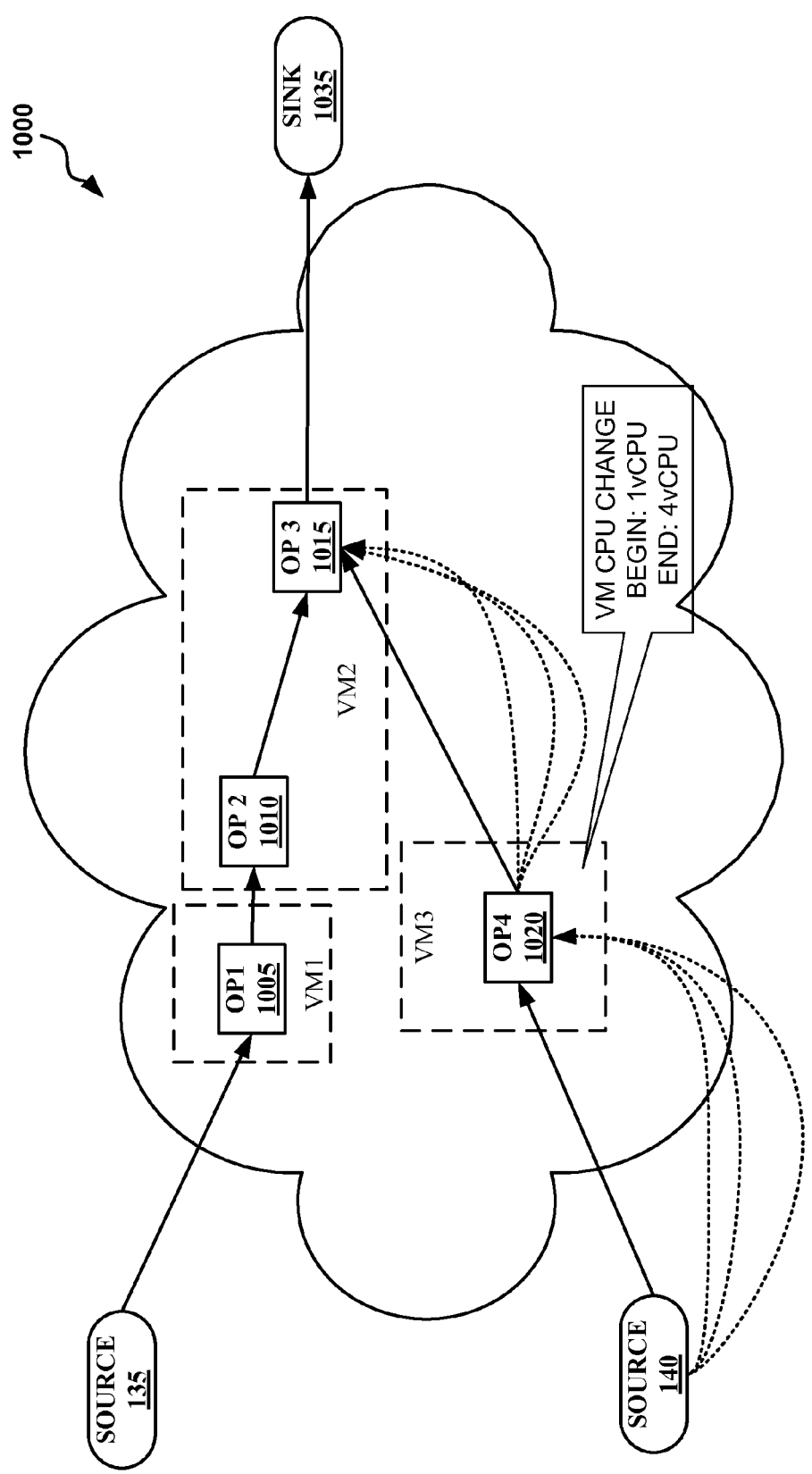
FIG. 10 illustrates a stream computing system configured to modify the processing of a stream operator in response to a change in a processor virtual resource of a virtual machine, according to various embodiments.

FIG. 10 illustrates a stream computing system 1000 configured to modify processing of a stream operator in response to a change in a processor virtual resource of a virtual machine, according to various embodiments. The system 1000 can have one or more virtual machines, VM1, VM2, and VM 3. The virtual machines can be mapped to virtual resources in a cloud configuration. For example, the VM1 can access distributed hardware resources from multiple servers while VM1 acts as an independent entity.

Each virtual machine can host one or more stream operators from an operator graph. For example, VM3 can host OP4 1020, VM2 can host OP2 1010 and OP3 1015, and VM1 can host OP1 1005. The operator graph can be configured to receive tuples to process from source 135 and source 140. The operator graph can be configured so that OP1 1005 receives tuples from source 135 and outputs to OP2 1010 which further outputs to OP3 1015. OP3 1015 can be an aggregate stream operator that receives tuples from OP4 1020. OP3 1015 can output tuples to the sink 1035. OP4 1020 can further receive tuples from a source 140.

As an initial state, VM3 1020 has access to 1 virtual CPU (vCPU). The resource allocation to VM3 1020 can increase for the vCPU resource. Once there is an increase for the vCPU resource, the stream computing system 1000 can redistribute the extra vCPU resources. Assuming that VM3 1020 has a high priority for receiving more vCPU resources, a stream manager in the stream computing system 1000 allocates 4 vCPU processing threads to the input and output of OP4 1020. The processing threads (illustrated with the dashed lines) increase the processing bandwidth of OP4 1020.

In various embodiments, the stream manager can examine the dependencies. The extra processing resources would be more beneficial closer to the source 140 to further enhance processing downstream, e.g., OP3 1015. Various factors can be used to determine the priority of OP4 1020. For example, if OP2 1010 has 10% utilization and OP3 1015 has 90% utilization, then the processing resources can go to OP3 1015 to lower the utilization of OP3 1015.

Figure 11:
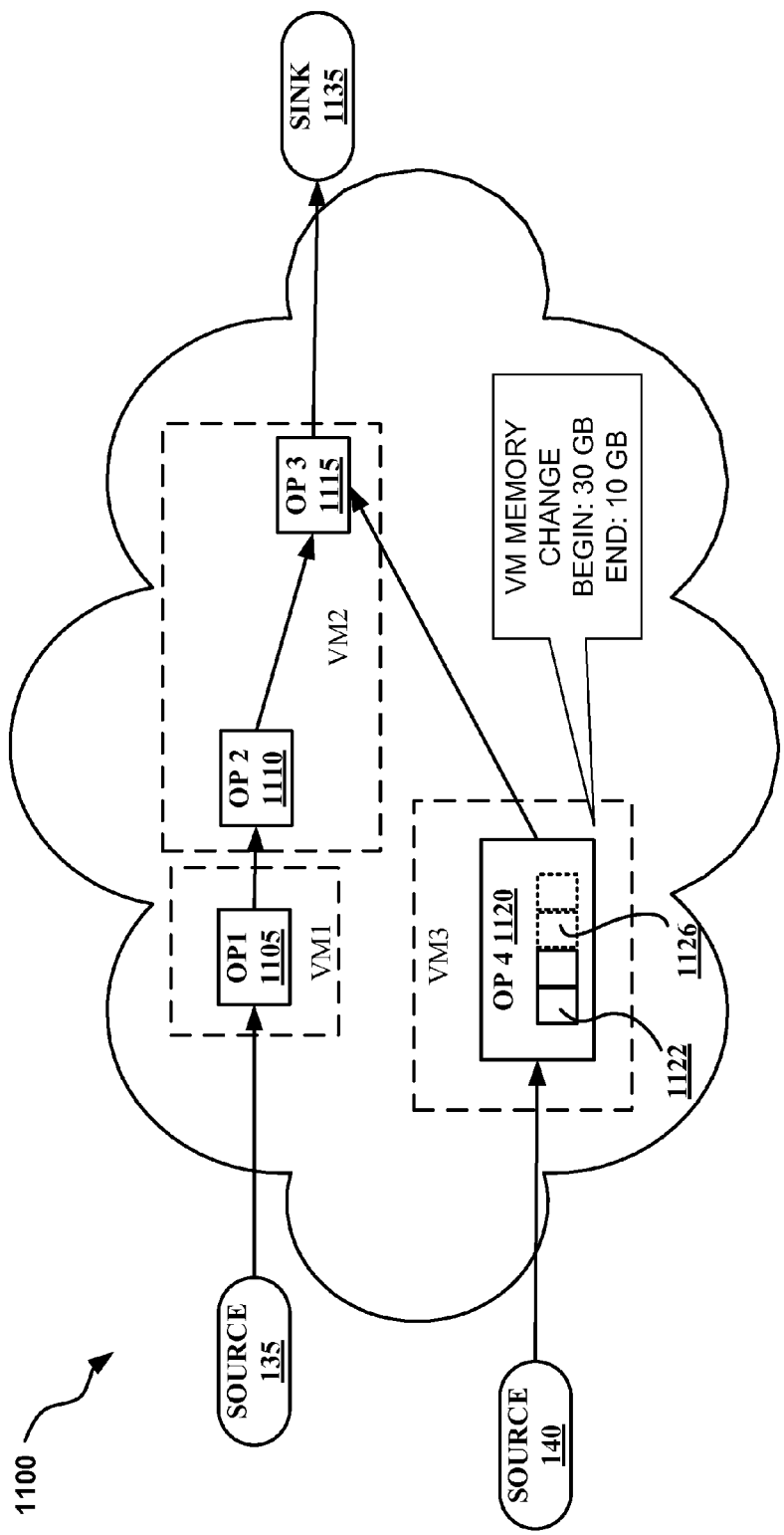
FIG. 11 illustrates a stream computing system configured to modify a memory buffer of a stream operator in response to a change in a memory virtual resource of a virtual machine, according to various embodiments While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

FIG. 11 illustrates a stream computing system 1100 configured to modify a memory buffer of a stream operator in response to a change in a memory virtual resource of a virtual machine, according to various embodiments. The stream computing system 1100 is similar to the stream computing system 1000 from FIG. 10. Instead of responding to changes in processing virtual resources, the stream computing system 1100 is configured to respond to changes in memory virtual resources.

Each virtual machine can host one or more stream operators from an operator graph. For example, VM3 can host OP4 1120, VM 2 can host OP2 1110 and OP3 1115, and VM1 can host OP1 1105. The operator graph can be configured to receive tuples to process from source 135 and source 140. The operator graph can be configured so that OP1 1105 receives tuples from source 135 and outputs to OP2 1110 which further outputs to OP3 1115. OP3 1115 can be an aggregate stream operator that receives tuples from OP4 1120. OP3 1115 can output tuples to the sink 1135. OP4 1120 can further receive tuples from a source 140.

As an initial state, VM3 has a memory virtual resource allocation of 30 GB. As the stream computing system 1100 is monitored, the virtual resource allocation for VM3 decreases to 10 GB. OP4 1120 has access to a memory buffer of an initial size, e.g., 1126. Assuming that OP4 1120 has a high priority for a downgrade in stream operator functions, then the memory buffer 1126 can reduce to memory buffer 1122. As a consequence, the percent utilization for VM3 may increase.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
    a virtual machine stored in a memory hosting at least one processing element, the processing element containing a plurality of stream operators from a stream computing application;
    one or more servers providing a plurality of virtual resources to the virtual machine;
    a stream application that manages allocation of the plurality of virtual resources from the one or more servers to the virtual machine, the stream application configured to:

initialize, based on a processing element, a first resource allocation of a first virtual resource, monitor operation of the virtual machine to allocate one or more virtual resources including the first virtual resource, detecting, based on the monitored operation of the virtual machine, a second resource allocation, determining, based on the detected second resource allocation, an increase in the first virtual resource compared to the first resource allocation, identify, based on the detected second resource allocation, the processing element of the stream application, increasing, based on the determined increase in the virtual resource and based on the identified processing element, a first stream operator function of the processing element of the plurality of stream operators, the first stream operator function corresponding to the first virtual resource;

determine a resource dependency that the first stream operator function depends on a second stream operator function corresponding to a second virtual resource, wherein the resource dependency is a ratio between the first stream operator function and the second stream operator function and is based on tuple processing performance monitored by the stream application, and increase, based on the determined resource dependency, the stream operator function of the processing element.

2. The system of claim 1, wherein the first virtual resource includes a memory.

3. The system of claim 1, wherein the stream application is configured to determine whether the second resource allocation changed within a dynamic tolerance relative to the first resource allocation.

4. A computer program product comprising a computer readable storage device having a computer readable program stored therein, wherein the computer readable program, when executed on a computing device, causes the computing device to:

initialize, based on a processing element, a first resource allocation of a first virtual resource, the first virtual resource provided by a virtual machine to enable operation of the processing element, the processing element containing one or more stream operators that operate on one or more tuples of the stream application;

monitor operation of the virtual machine to allocate one or more virtual resources including the first virtual resource;

detect, based on the monitored operation of the virtual machine, a second resource allocation;

determine, based on the detected second resource allocation, an increase in the first virtual resource compared to the first resource allocation;

identify, based on the detected second resource allocation of the virtual machine, the processing element of the stream application;

increase, based on the determined increase in the virtual resource and based on the identified processing element, a first stream operator function of the processing element, the first stream operator function corresponding to the first virtual resource;

determine a resource dependency that the first stream operator function depends on a second stream operation function, the second stream operator function corresponding to a second virtual resource, wherein the resource dependency is a ratio between the first stream operator function and the second stream operator function and is based on tuple processing performance monitored by the stream application; and increase, based on the determined resource dependency, the second stream operator function of the processing element.

5. The computer program product of claim 4, wherein the virtual resource includes a geographic location of a server.

* * * * *